(12) United States Patent
Astic

(10) Patent No.: US 6,567,033 B1
(45) Date of Patent: May 20, 2003

(54) ANALOG ANGULAR CODER

(75) Inventor: Georges Astic, Saint Marcel les Valence (FR)

(73) Assignee: Crouzet Appliance Controls S.A., Montelier Chabeuil (FR)

( * ) Notice: Subject to any disclaimer, the term of this patent is extended or adjusted under 35 U.S.C. 154(b) by 0 days.

(21) Appl. No.: 09/402,447

(22) PCT Filed: Apr. 7, 1998

(86) PCT No.: PCT/FR98/00695

§ 371 (c)(1),
(2), (4) Date: Feb. 22, 2000

(87) PCT Pub. No.: WO98/45666

PCT Pub. Date: Oct. 15, 1998

(30) Foreign Application Priority Data

Apr. 7, 1997 (FR) .............................. 97 04194

(51) Int. Cl.$^7$ ................................. G01B 7/30
(52) U.S. Cl. .................. 341/192; 702/163; 702/94; 324/207.23
(58) Field of Search ................. 341/192, 35, 190, 341/16; 73/84; 338/132, 118; 702/163, 158, 94; 324/207.23

(56) References Cited

U.S. PATENT DOCUMENTS

| | | | | |
|---|---|---|---|---|
| 3,982,106 A | * | 9/1976 | Stutz | 250/237 G |
| 4,070,762 A | * | 1/1978 | Siddall | 33/504 |
| 4,599,605 A | * | 7/1986 | Froeb et al. | 200/11 DA |
| 4,849,680 A | * | 7/1989 | Miyamoto | 318/602 |
| 4,942,394 A | * | 7/1990 | Gasiunas | 101/110 |
| 5,399,981 A | * | 3/1995 | Vermesse | 324/714 |
| 5,438,330 A | * | 8/1995 | Yamazaki et al. | 341/11 |
| 5,905,350 A | * | 5/1999 | Hofbauer et al. | 318/430 |

FOREIGN PATENT DOCUMENTS

| | | | |
|---|---|---|---|
| GB | 2228835 | * | 9/1990 |

* cited by examiner

*Primary Examiner*—Michael Horabik
*Assistant Examiner*—Hung Dang
(74) *Attorney, Agent, or Firm*—Dennison, Schultz & Dougherty

(57) ABSTRACT

An analog angle encoder is provided having a resistor track and a wiper contact associated with the resistor track, a conductor track concentric with the resistor track, wherein one end of the resistor track is connected to ground and the other end is connected to an alternating voltage.

10 Claims, 1 Drawing Sheet

ANALOG ANGULAR CODER

Figure 1:
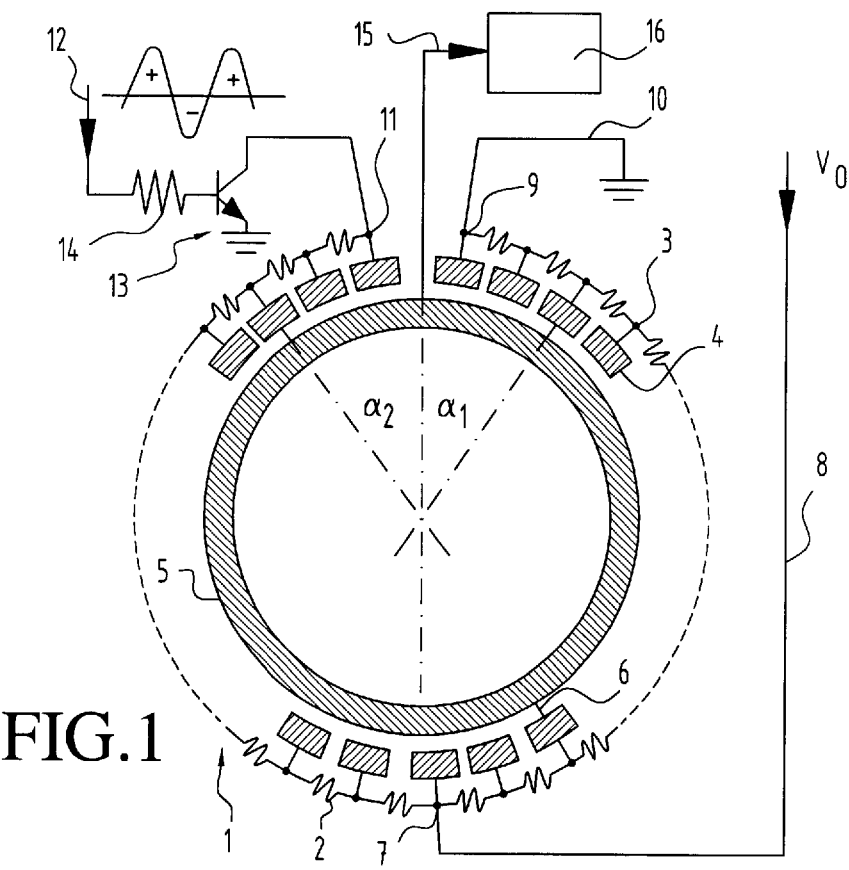

The present invention relates to an analog angle encoder, and more particularly to such an encoder of the type including a resistor track, means for connecting the first and second ends of the resistor track to a first potential and a second potential respectively, and means for reading the potential at the point of the resistor track in contact with the wiper contact and a wiper contact associated with this track.

Known encoders of this type, such as described for example in British Patent GB-A 2 228 835, U.S. Pat. No. 3,205,365, and German Patent Disclosure DE-A 2,654,238, generally include a resistor track that is practically circular and is supplied at its ends with direct current, as well as a conductor track concentric with the resistor track, and a wiper contact is mounted to rotate about the center of the tracks and connects to homologous points of each of the tracks. It can be understood that the voltage measured at the conductor track is proportional to the angle between the end of the resistor track connected to ground and the points connected by the wiper contact.

Such devices are used for example in systems that associate a mechanical portion and an electronic portion, such as washing machine programmers, in which the processing electronics must be capable of economically, by direct reading, learning the angular position of a rotary shaft with a given precision, ranging for example from 10 to 68 positions per revolution.

What is meant by the term direct reading is the possibility of recognizing the position of the axis within a fraction of a second, which precludes systems that function by incremental reading, or in other words by adding increments since an original position.

Up to a certain number of positions per revolution, on the order of eight, for example, the combined use of a medium-quality potentiometer and a microprocessor equipped with an analog/digital converter, each of them supplied with the same voltage such as 5 V, makes it possible to achieve the desired result. However, for the functions of selection and display of the washing programs for washing machine programmers, it is necessary to attain a range of from 18 to 60 positions per revolution. It is not possible to attain these levels of angular definition while keeping an economical system based on the combined use of a potentiometer and a microprocessor equipped with an analog/digital converter.

The problems are in fact of two kinds:

First, the response curve of the potentiometer is not linear; that is, if one traces the graph of cursor response (with the rotation on the abscissa and the potential of the cursor on the ordinate) the curve obtained is not sufficiently rectilinear to allow making a biunique correlation between the voltage obtained and the angular position of the axis.

The other problem resides in the lack of mechanically rigorous positioning of the axis in its fundamental positions.

It is also worthwhile to stay with analog technology, which requires minimum inputs to the microprocessor and thus limits the expense.

Then an economical potentiometer could still be used, that is, a non-linear potentiometer, and the characteristic curve of the potentiometer could be memorized in nonvolatile memory in the microprocessor. However, this entails additional expense because of the requirement for read-only memory and because of the time required for this memorization.

Another solution would be to use a potentiometer with sufficient linearity so that the associated microprocessor can associate the voltage picked up by the cursor with the angular position of the axis without error. However, even in this case, there may be some error due to an insufficient quality of the positioning of the axis at its fundamental position; that is, the axis may be stopped between two fundamental positions.

The present invention seeks to overcome these disadvantages.

To that end, the subject of the invention is an analog angle encoder of the type including a resistor track and a wiper contact associated with this resistor track, means for connecting the first end and the second end of the resistor track to a first potential and a second potential, respectively, and means for reading the potential at the point of the resistor track in contact with the wiper contact, characterized in that it includes means for connecting another point of the resistor track to a third potential, and means for modulating at least the aforementioned first or second potential, the aforementioned third potential being fixed.

In a particular embodiment of the invention, one of the aforementioned first or second potentials is fixed.

Also in a particular embodiment of the invention, at least one of the aforementioned first or second potentials is modulated in square-wave fashion.

Also in a particular embodiment of the invention, the aforementioned other point is substantially at the center of the resistor track.

More particularly, the encoder of the invention may include a conductor track concentric with the resistor track, the wiper contact connecting a point of the resistor track to the conductor track, and the potential at the point of the resistor track in contact with the wiper contact being read on the conductor track.

Thus if one assumes for example that the two ends of the resistor track are connected to ground, and that a given supply voltage $V_0$ is applied to its center point, the two halves of this track are supplied with the same voltage. As a consequence, two possible angular positions correspond to reading of a given potential. They are discriminated from one another by way of the different modulations that are picked up depending on whether the pickup is made from one or the other half of the track.

Figure 2:
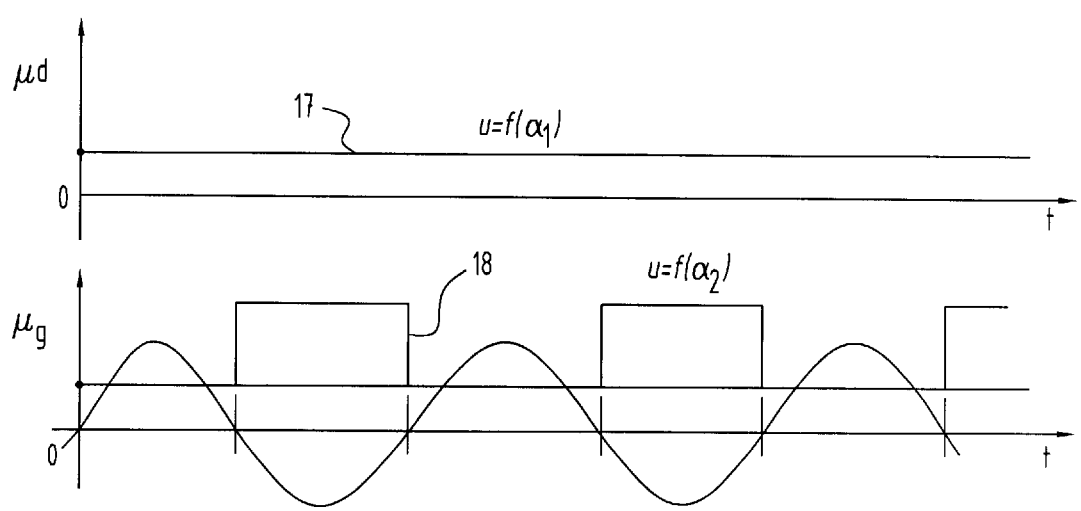

By way of nonlimiting example, a particular embodiment of the invention will now be described in conjunction with the accompanying schematic drawing, in which FIG. 1 shows an encoder according to the invention;

FIG. 2 shows the signals picked up at this encoder.

FIG. 1 shows an encoder that in a known manner includes a resistor track 1. The track 1 here is formed of a set of discrete resistors 2, whose interconnections 3 are connected to voltage pickup pads 4. This track, however, could also be embodied in continuous fashion, for example by screen printing, in which case the voltage would be picked up directly on the track.

A conductor track 5 is made concentric with the track 1. A cursor, not shown, mounted to rotate in the center of the tracks 1 and 5 and whose angular position is to be measured, carries a wiper contact 6 that connects the pad corresponding to this position of the track 5.

The median point 7 of the resistor track 1 is connected to the supply voltage $V_0$ by a line 8.

One of the ends 9 of the track 1 is connected to ground by a line 10. Its other end 11 is connected to an alternating voltage, in this case the sector 12, by way of a switch 13.

The switch 13 in the present case comprises a transistor whose collector is connected to the point 11, whose emitter is connected to ground, and whose base is connected to the sector by way of a resistor 14.

Finally, the conductor track 5 is connected by a line 15 to the analog input of a microprocessor 16.

If the switch 13 is now assumed to be closed, then it can be found that the same, continuous voltage will be read at two pads 4 that are symmetrical relative to the point 7. Such a voltage $u_d$ is shown at 17 in FIG. 2.

However, the switch 13 is not permanently closed, since the base of the transistor is connected in alternation to positive and then negative voltages. The transistor is thus alternatively saturated and then blocked. As a result, the voltage $u_g$ read at the pads located on the left, in terms of FIG. 1, of the median point 7 is modulated in square-wave fashion, as shown at 18 in FIG. 2.

Consequently, the microprocessor will recognize which half of the resistor track the wiper contact 6 is located on from the shape of the voltage picked up at the track 5.

A double definition is thus obtained, compared with what would be obtained by referring simply to the point 11 at the potential $V_0$.

What is claimed is:

1. An analog angular encoder, comprising:
   a resistive track (1) having a first end (9) and a second end (11);
   means (10) for bringing the first end (9) of the resistive track to a first potential;
   means (12) for bring the second end (11) of the resistive track to a second potential;
   means (8) for bringing another point (7) of the resistive track to a third potential, wherein said third potential is fixed;
   means (13) for modulating at least said first or second potentials;
   a brush (6) associated with the resistive track; and
   means (5, 15, 16) for reading the potential of the point on the resistive track in contact with the brush.

2. The encoder of claim 1, in which one of said first or second potentials is fixed.

3. The encoder of claim 1, in which at least one of said first or second potentials is modulated in square-wave fashion.

4. The encoder of claim 1, in which said other point is substantially at the center of the resistor track.

5. The encoder of claim 1, including a conductor track (5) concentric with the resistor track, the wiper contact connecting a point of the resistor track to the conductor track, and the potential at the point of the resistor track in contact with the wiper contact being read on the conductor track.

6. The encoder of claim 2 in which at least one of said first or second potentials is modulated in square-wave fashion.

7. The encoder of claim 2 in which said other point is substantially at the center of the resistor track.

8. The encoder of claim 3 in which said other point is substantially at the center of the resistor track.

9. The encoder of claim 2 including a conductor track (5) concentric with the resistor track, the wiper contact connecting a point of the resistor track to the conductor track, and the potential at the point of the resistor track in contact with the wiper contact being read on the conductor track.

10. The encoder of claim 3 including a conductor track (5) concentric with the resistor track, the wiper contact connecting a point of the resistor track to the conductor track, and the potential at the point of the resistor track in contact with the wiper contact being read on the conductor track.

* * * * *